Feb. 24, 1953 D. H. RING 2,629,782

REDUCTION OF PHASE DISTORTION

Filed Aug. 20, 1949 4 Sheets-Sheet 1

INVENTOR
D. H. RING
BY
N. S. Ewing
ATTORNEY

REDUCTION OF PHASE DISTORTION

Filed Aug. 20, 1949 4 Sheets-Sheet 2

INVENTOR
D. H. RING
BY
N. S. Ewing
ATTORNEY

REDUCTION OF PHASE DISTORTION

INVENTOR
D. H. RING
BY N. S. Ewing
ATTORNEY

INVENTOR
D. H. RING
BY
N. S. Ewing
ATTORNEY

Patented Feb. 24, 1953 2,629,782

UNITED STATES PATENT OFFICE 2,629,782

REDUCTION OF PHASE DISTORTION

Douglas H. Ring, Red Bank, N. J., assignor to Bell Telephone Laboratories, Incorporated, New York, N. Y., a corporation of New York Application August 20, 1949, Serial No. 111,495

7 Claims. (Cl. 179—15)

This invention relates to the long distance transmission of intelligence through highly dispersive transmission media and more particularly to the transmission of intelligence-bearing electromagnetic waves through wave guides.

The wave guide, or hollow pipe guide, is well adapted for the transmission of signals in the microwave frequency range, particularly in regard to its freedom from cross-talk and similar interference and its relatively uniform and low attenuation. Unlike conventional transmission lines, however, the wave guide has the peculiar property that it is highly dispersive, i. e., the phase velocity of wave transmission varies markedly and non-linearly with frequency, especially so in the frequency range somewhat above the transmission cut-off frequency that is of principal interest for communication purposes. In many instances in practice the wave guide is short enough so that the dispersive effect, or phase velocity distortion, is of no practical consequence; but in guides of the length required for a nationwide toll transmission system the cumulative dispersion effect is calculated to be a major factor limiting the intelligence-carrying capacity of the system.

A principal consequence of dispersion is distortion of the modulated signal when recovered at receiving stations in the system, the modulation distortion being in the form of phase distortion and also practically ineradicable harmonic and non-linear amplitude distortion. This is true of all types of modulation in which the transmitted intelligence is represented by definite relationships between the energy carried by each of the signal sidebands and the energy carried by the carrier wave, such as frequency modulation, double sideband amplitude modulation, pulse modulation or phase modulation, for example. In these cases the effect of dispersion is to upset the definite relationship of the signal sidebands and the carrier and thus introduce ineradicable distortion in the demodulated output. An interesting exception to this effect are signals transmitted in the form of a single sideband of an amplitude modulated carrier wave which are known to be relatively immune to such distortion.

Cumulative dispersion tends also to give rise to distortion of the transmitted signals in the wave-guide line. Thus the sharp discrete pulses of carrier wave energy that are transmitted over the guide when pulse modulation is employed at the transmitting station tend to broaden and overlap in the course of transmission and to lose their identity in the transmission system noise, thus demanding complex regenerative repeaters at close intervals.

The effect of phase velocity distortion can be reduced by decreasing the width of the transmitted signal band or by increasing the operating frequency relative to the cut-off frequency of the guide. The former method, however, results in reduced intelligence-carrying capacity of the system while the latter facilitates degeneration of the transmitted energy into undesirable higher order wave transmission modes.

A principal object of the present invention is to increase the intelligence-bearing capacity of a transmission system of the kind described.

A further object is to mitigate the effect of dispersion in a long distance wave-guide transmission system.

In accordance with a principal feature of the present invention the dispersion introduced by different sections of a long distance wave-guide signal transmission line is caused to be counteracted by the dispersion introduced by other sections. More particularly, the signal band is inverted in the frequency spectrum at one or more points along the line, the frequency about which the band is inverted being so chosen as to reduce substantially the distortion, due to dispersion, that tends to appear in the received signal, and to secure other advantages as will presently appear.

In accordance with another principal feature of the present invention, a transmitted double sideband signal representing pulse code modulation is inverted at such short intervals to substantially increase the distance permitted between regenerative repeaters.

In a simple embodiment of the invention hereinafter to be described in detail, the total signal to be transmitted, comprising for example many television and/or telephone signals combined by frequency or time multiplexing and having a total band width of the order of a hundred megacycles or more, is amplitude modulated upon a microwave carrier and the resulting set of signal sidebands with their associated carrier signal is impressed as a "high frequency signal" on a wave guide. At intervals along the guide the high frequency signal is amplified and at intervals it is passed through a device that inverts it about the frequency of the microwave carrier. After an odd number of such inversions the high frequency signal reaches a receiving station where it is detected to reproduce the total signal. The latter is then separated in accordance with usual practice to recover the various component television and telephone signals.

Further features of the invention are to be found in the band-inverting devices to be described hereinafter.

In accordance with another feature of the invention a multiplicity of the wide "total signal" bands of the kind described are modulated upon individual microwave carrier waves and the various sets of resulting sidebands and associated carrier waves are impressed concurrently on the wave guide, these signal sets being then separated at intervals along the guide and each set inverted for application to the succeeding section of guide. In such case the various sets of sidebands may be inverted about frequencies differing somewhat from their respective carrier frequencies, with attendant advantages that will be pointed out hereinafter.

Still other features of the invention reside in the band-separating circuits.

The nature of the present invention and its various objects, features and advantages will appear more fully upon consideration of the embodiments illustrated in the accompanying drawings and the following detailed description thereof.

Figure 1:
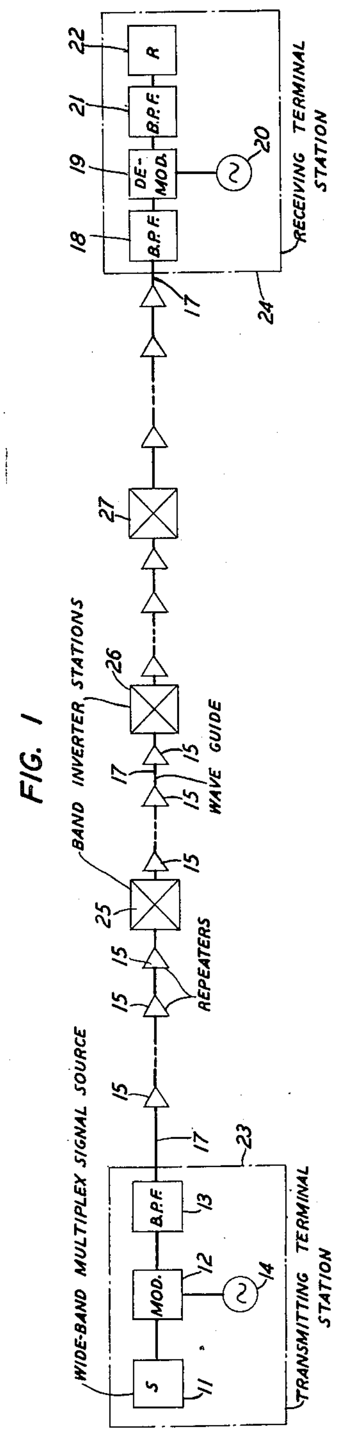
Fig. 1 shows, schematically, a long distance wave-guide communication system for transmitting wide band multiplex signals in accordance with the invention.

A simple embodiment of the invention is shown in Fig. 1, wherein a wide band multiplex signal from transmitting terminal station 23 is applied to long distance wave-guide transmission system 17 for communication to receiving terminal station 24. The high frequency signal transmitted by station 23 will suffer attenuation and phase dispersion due to the transmission characteristics of the long distance wave guide. To eliminate the effects of attenuation characteristic a plurality of microwave repeaters 15 are placed at intervals along wave-guide line 17. Depending upon particular system requirements, low gain repeaters at closely spaced intervals may be used, or on the other hand, high gain repeaters may be used at farther intervals.

To reduce or eliminate the effects of the phase dispersion characteristic, a plurality of band-inverter stations, for example, 25, 26 and 27, are placed at greater intervals along the line in accordance with the invention.

The transmitting terminal station 23 may comprise a signal source 11, a modulator 12, a microwave carrier source 14 and a form of output band-pass filter 13 as fundamental units. In such a system signal source 11 may be the output of any well-known wide band multiplex signal device. For example, the signal derived from source 11 may comprise a telephone carrier system carrying a large number of telephone circuits in the order of a thousand or more telephone channels, or a plurality of television circuits, or a large number of signal channels combined by time division multiplexing. Such a signal representing the intelligence to be transmitted is impressed in modulator 12 on the microwave carrier from source 14. Modulator 12 will combine the intelligence signal with the carrier wave in accordance with the characteristics of the modulating process employed. Any of the well-known types of modulation may be used, for example, double sideband amplitude modulation, frequency modulation, pulse modulation, or phase modulation. In each of these systems the intelligence is represented in the resulting high frequency signal by a definite phase, amplitude and/or frequency relationship between each of the signal sidebands and the carrier wave and would require a transmission medium affording a band width well in excess of several hundred megacycles for successful communication. This resulting high frequency signal is impressed on wave-guide transmission line 17 through band-pass output filter 13 which passes the frequency components desired to be transmitted to the line.

Wave guide 17 may be any of the well-known rectangular or circular conducting pipes. The circular type appears to be particularly well adapted for long distance transmission systems due to its known unusually low attenuation properties when used with circular electric waves.

Wave guide 17 may be evacuated or it may be filled with air or other gaseous dielectric. If the guide is filled with a gas, an additional distorting factor of the molecular absorption of the gas must be considered. It is known in the art that many gaseous substances will absorb transmitted microwave energy due to their molecular resonance in certain absorption bands. Each gas has absorption bands of definite location in the spectrum particularly characterized from the others. This absorption of frequencies from the transmitted wave energy may be controlled, or avoided, by controlling the composition of the gaseous dielectric in the wave guide so that the absorption bands of the dielectric will fall outside the transmitted frequency band. Conversely, it is possible to avoid the molecular absorption effects of a particular gas dielectric by choosing the operating frequency band of the transmitted energy between or beyond the particular absorption bands.

The receiving terminal station 24, like transmitting terminal station 23, may be of any well-known design adapted to receive the wide band high frequency signal, demodulate it and separate it into its component signal channels. For example, the station may comprise an input broadband filter 18 through which the line frequencies are passed to a demodulator 19 where the total signal is demodulated with a local oscillator source 20 supplying beating oscillations, a suitable filter means 21 to separate the component signal channels in accordance with the usual practice to recover the various component telephone and television signals, and a receiver means 22.

The band-inverter stations 25, 26, 27, may be of the types to be described hereinafter in detail, and their function, placement, operation and the various advantages therefrom will immediately become apparent.

First, however, it will be desirable to analyze the dispersive effect of a long wave guide on the high frequency wave transmitted therethrough and its subsequent effect on the demodulated output thereof.

Consider therefore a single long section of repeatered wave guide such as that between the transmitting terminal station 23 and the first inversion point 25. Such a wave-guide section is highly dispersive and will destroy the essential phase relationships of the carrier and each of the sideband pair components. This effect may be termed wave dispersion or phase velocity distortion.

The magnitude of this phase velocity distortion varies appreciably and non-linearly with frequency. For example, assume that the wave transmitted from station 23 is of the double sideband amplitude modulated type having an angular carrier frequency $\omega$ and an angular modulation frequency $p$. After such a wave has progressed down the line a given distance, for example to the first inverter station 25, the effect of the line dispersion will be such as to introduce a shift to the phase angle of each component frequency of the wave. As a result the lower sideband component will suffer a smaller phase shift angle $\varphi_1$, than the carrier phase shift angle $\varphi_0$. Likewise the upper sideband component will suffer a greater phase shift angle $\varphi_2$ than the carrier phase shift angle $\varphi_0$.

If this phase shift characteristic were linear with respect to frequency, i. e., $\varphi_2-\varphi_0$ equals $\varphi_0-\varphi_1$, thus affording a symmetrical delay characteristic about the carrier frequency, the sidebands would suffer the same delay and, therefore, would add in phase upon demodulation, and there would be no amplitude distortion.

If, however, as in the case of a long wave guide, the phase shift characteristic is non-linear or dispersive with respect to frequency, i. e., a greater phase shift with respect to the carrier in the lower sideband frequencies than in the upper sideband frequencies or $\varphi_0-\varphi_1$ greater than $\varphi_2-\varphi_0$, a non-symmetrical delay characteristic about the carrier frequency is rendered, and the sidebands will not add in phase upon demodulation. Rather, the out-of-phase sidebands will be combined to produce a demodulated output suffering both amplitude and phase or delay distortion. Since the magnitude of these distortion effects depends upon frequency, the dispersion giving rise thereto will be instrumental in limiting the useful band width of the wave guide. Because the required band width is very large, elimination of this undesirable dispersive property is highly desirable.

To realize these effects more explicitly an amplitude modulated wave that has suffered dispersion in being transmitted from station 23 to inverter station 25 may be represented by the expression $$E_m=\cos(\omega t+\varphi_0)+A\cos[(\omega-p)\ t+\varphi_1]+A\cos[(\omega+p)\ t+\varphi_2] \quad (1)$$

wherein $\varphi_0$, $\varphi_1$ and $\varphi_2$ are the phase shift angles suffered by the carrier, the lower sideband and the upper sideband components, respectively, and $\omega$ and $p$ represent the angular frequency of the carrier and the modulation respectively.

When such a signal is demodulated by either a linear or square law detector, the output will, in general, contain the fundamental modulation $p$, harmonics of $p$ and cross-products if more than one modulating frequency is present. Owing to the presence of such components, a mathematical analysis of the entire output would be very technical. However, attention may be restricted to the phase and amplitude distortion suffered by the fundamental alone, realizing that the ignored harmonics and cross-modulation also introduce an appreciable portion of the distortion suffered by complex modulating signals.

The fundamental output can be obtained by considering each of the sidebands of (1) as separately demodulated by the carrier to yield two components of the fundamental output E. Thus, $$E=A\cos(pt-\varphi_1+\varphi_0)+A\cos(pt+\varphi_2-\varphi_0) \quad (2)$$

$$\theta=\frac{\varphi_1+\varphi_2-2\varphi_0}{2} \quad (3)$$

$$B=\frac{\varphi_2-\varphi_1}{2} \quad (4)$$

the output E may be expressed as $$E=2A\cos\theta\cos(pt+B) \quad (5)$$

Thus the dispersion of the carrier wave and its signal sidebands alters the amplitude of the fundamental demodulated output by $\cos\theta$ and shifts its phase by an angle B, introducing amplitude and phase distortion. Since $\theta$ is a function of frequency, the distortion will generally increase with the modulating frequency. In this way dispersion in the wave guide will limit the useful band width of the wave-guide transmission line.

In accordance with an object of the invention the intelligence-bearing capacity of the wave-guide transmission system is increased by introducing band inverter stations, for example stations such as 25, 26 and 27, at intervals along the length of the line thereby reducing the magnitude of $\theta$ in Equation 3, and thus reducing the magnitude of amplitude distortion in the demodulated output.

When a high frequency signal comprising a microwave carrier and a set of signal sidebands each frequency of which has suffered a particular value of phase angle distortion is inverted about the carrier frequency, the signs of all phase angles are changed. This inversion process is such that the signal band is inverted in the frequency spectrum. In other words, energy formerly carried in the highest frequency component of the upper sideband appears in the lowest frequency component of the lower sideband. Conversely, the energy formerly carried in the highest frequency component of the lower sideband becomes the lowest frequency in the upper sideband. The band may be inverted about a frequency substantially the same as the original carrier frequency, or as hereinafter described, about a frequency slightly removed from the original carrier frequency.

The wave reaching band inverter station 25 has been expressed by Equation 1 and has suffered phase shift angles $\varphi_1$, $\varphi_2$ and $\varphi_0$. Inverter station 25 inverts the wave in the manner described about the carrier frequency, thereby changing the signs of each of the phase angles. The inverted wave is passed through a second section of repeatered line, having the same phase characteristics as the first section, to band inverter station 26. At the end of the second section, before entering band inverter station 26, the net phase shift of each component frequency is mathematically the sum of the phase shift derived from the first section with its sign reversed, and the shift derived from the second section. Therefore the phase shift of the carrier frequency is $\varphi_0 - \varphi_0 = 0$. Likewise the net phase shift of the final lower sideband is $\varphi_1 - \varphi_2$, and the net phase shift of the final upper sideband is $\varphi_2 - \varphi_1$.

Substituting these values in Equations 3 and 4

$$2\theta=\frac{(\varphi_1-\varphi_2)+(\varphi_2-\varphi_1)-2(0)}{2}=0 \qquad (6)$$

$$2B=\frac{(\varphi_2-\varphi_1)-(\varphi_1-\varphi_2)}{2}=\varphi_2-\sigma_1 \qquad (7)$$

$$B=\frac{\varphi_2-\varphi_1}{2} \qquad (8)$$

The factor 2 on the left of Equations 6 and 7 account for the fact that the total section length is twice that of the single section of Equation 2; thus the angles are for a double section. The average B per section is given by Equation 8 and is the same as the value of B for a single section shown in Equation 4.

It is seen that the process of inversion has made the amplitude distortion angle $\theta$ equal to zero. Thus cos $\theta$ has become equal to unity and all amplitude distortion has been eliminated.

The carrier wave leaving the second section may now be represented by the expression $$E_m=[1+2A\cos(pt+2B)]\cos(\omega t) \qquad (9)$$

which is simply an amplitude modulated wave with the envelope phase shifted by an angle 2B. Thus non-linear distortion suffered by the fundamental component is eliminated therefrom.

The demodulated output becomes $$E=2A\cos(pt+2B) \qquad (10)$$

The phase shift due to B may be easily equalized by well-known methods

The effect of phase dispersion on the demodulated output of a modulated carrier and the elimination of these effects by the process of inversion has been analyzed in detail with respect to the fundamental of an amplitude modulated wave due to the relative simplicity of the mathematical functions arising from this type of modulation, but it should be pointed out that the beneficial results of the invention are equally applicable to other well-known types of modulation such as frequency or phase modulation. Regardless of the type modulation impressed on the signal wave, the effect of dispersion of the component frequencies of the signal wave on passing through a first wave-guide section may be mitigated by the process of inversion and the subsequent passing of the inverted wave through a similar wave-guide section. Further, it may be shown that all similar order modulation harmonics and cross-products, if more than one modulating frequency is present, are affected in the same manner as the fundamental, with the result that non-linear distortion of the demodulated output is substantially reduced.

Thus in the illustrative system of Fig. 1, the transmitted signal, which suffers a certain amount of phase dispersion in passing through the wave guide 17 and repeaters 15 from the transmitting terminal station 23 to band-inverter station 25, is inverted and passed through the second section from inverter station 25 to inverter station 26, during which time the dispersion introduced by the first section is progressively canceled during passage through the second section. The process continues in similar fashion down the length of the line, which may be several thousand miles, to the receiving terminal station.

It is evident that in order to obtain maximum advantage over the full line length of the counteraction of the phase dispersion introduced by each wave-guide section preceding an inverter station by the phase dispersion introduced by the wave-guide section following each inverter station, there should be an odd number of such inversion stations along the length of the line. Thus an equal number of sections are provided having "positive" phase characteristics and "negative" phase characteristics.

Figure 1A:
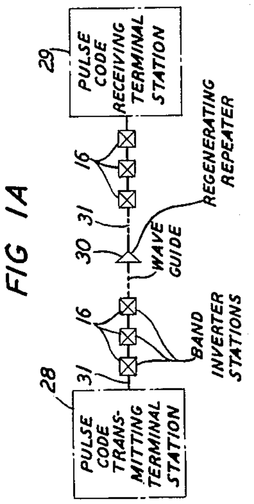
Fig. 1A illustrates, schematically, a variation of the arrangement of Fig. 1 particularly adapted for use with pulse code transmission systems.

Fig. 1A illustrates a variation of the long distance wave-guide communication system shown in Fig. 1 which is particularly adapted for use with a pulse code transmission system. Pulse code transmitting terminal station 28 and pulse code receiving terminal station 29 are shown connected by means of a long distance wave guide 31. Along the length of the line are located band inverter stations 16, and at less frequent intervals regenerative repeaters 30.

Particular advantage is obtained when the principles of the invention are applied to pulse transmission systems, for example, pulse code modulation. The operation of these systems is well known, and briefly consists in representing the intelligence waves, i. e., telephone and/or television signals, by sequences of on-off constant-amplitude pulses. Reception of such pulses demands simply recognition of whether the pulse exists or not. A regeneration process may be used at repeater points to overcome transmission impairments which consist of the production of a properly formed standard pulse, to correspond with each received pulse, and is effective so long as each received pulse is individually capable of being identified, even though the latter may be considerably misformed.

Since it is desirable to transmit as great a number of pulses as possible in a given time interval, the pulse width and interval between the pulses must be maintained very small. Thus the system is unusually susceptible to the undesirable effects of phase dispersion when the pulses are transmitted through a long wave guide. The effect of phase dispersion causes the pulses to spread and overlap, and as a consequence, to lose their identity in the transmission system noise. For this reason it has heretofore been necessary to place regenerative repeaters at relatively close intervals along the line to regenerate the pulses before they become distorted beyond all recognition.

Fig. 1A shows in accordance with the invention how the distance between such regenerative repeaters may be substantially extended. Pulse code transmitting terminal station 28 transmits pulses of the type described down a long distance wave guide 31. Band inverter stations 16 are placed at intervals along the line which intervals compare in general with those formerly required for the regenerating repeaters, and at substantially less frequent intervals pulse regenerating repeaters 30 are placed, one of which is shown in the drawing. Preferably, an odd number of equally spaced inverter stations 16 should be placed between each terminal and regenerating repeater or between successive regenerating repeaters. Thus, the effects of phase dispersion due to the transmission through the wave guide are eliminated by the inclusion of inverting stations in accordance with the invention at shortly spaced intervals. This allows an extended distance between regenerative repeaters. From an economic standpoint this extension is of extreme value because of the relative simplicity and lower cost of the inverter stations as compared with the regenerating repeaters.

Although the advantages of the invention have been particularly specified with respect to certain types of transmission systems, it should be noted that the elimination of phase dispersion or phase velocity distortion in the transmission medium by the process of inversion is applicable to all types of intelligence transmission in which phase dispersion is an undesirable factor, particularly through long wave guides.

Figure 2:
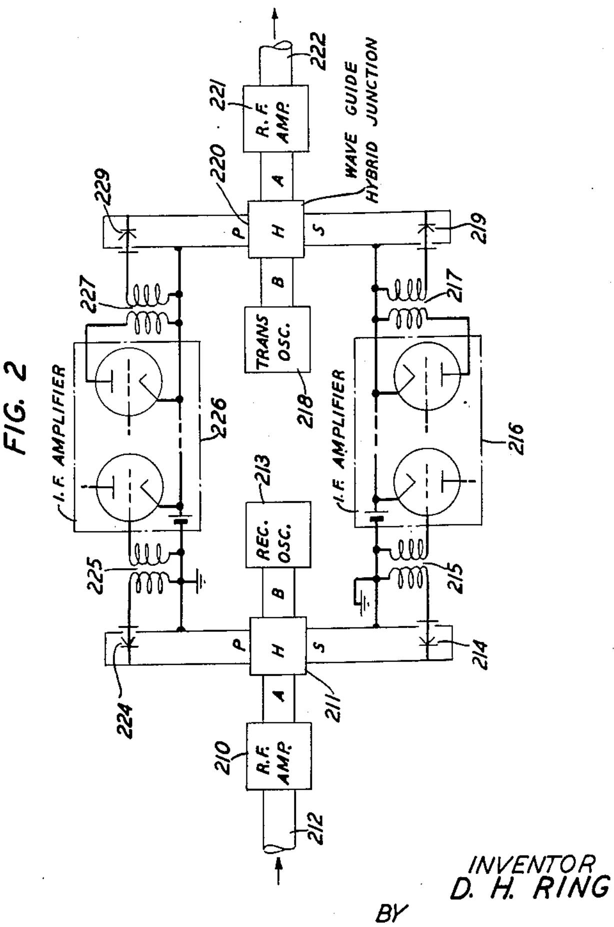
Fig. 2 illustrates a specific form of microwave-inverting repeater therefor.

Fig. 2 shows a repeater suitable for use in the long distance transmission systems of Fig. 1 and Fig. 1A. This repeater may be used to insert a desired amount of gain in the wave-guide path in addition to inverting the signal bands in accordance with the invention.

In Fig. 2 radio frequency amplifier 210 is shown with its input connected to input line 212 and its output connected to terminal A of hybrid 211. A heterodyne receiving oscillator 213 is connected to conjugate terminal B of the hybrid. Identical crystal heterodyne detectors 214 and 224 are matched to terminals S and P, respectively, of hybrid 211. The I. F. outputs of these detectors are matched to inputs of I. F. amplifiers 216 and 226 by transformers 215 and 225. The outputs of I. F. amplifiers 216 and 226 are matched to two identical crystals 219 and 229 by transformers 217 and 227, respectively. These crystals are connected to the P and S arms of hybrid 220 and a transmitting heterodyne oscillator 218 is connected to arm B of the hybrid 220. Arm A, the output of hybrid structure 220, feeds radio frequency output amplifier 221 connected to output line 222. The crystal detector-hybrid-oscillator structure 219, 229, 220, 218 may be the same as the input detector-hybrid-oscillator structure 214, 224, 211, 213.

Radio frequency amplifiers 210 and 221 may be of the type of any well-known microwave amplifiers, for example, the velocity modulator or traveling wave type amplifier as disclosed in United States application of J. R. Pierce, Serial No. 640,597, filed January 11, 1946, and described in the Proceedings of the Institute of Radio Engineers, February 1947, volume 35, pages 108–111, or a closely spaced triode amplifier of the type disclosed in United States application of J. A. Morton-R. L. Vance, Serial No. 572,596, filed January 13, 1945, which has now matured into United States Patent 2,502,530, granted April 4, 1950.

Other components, for example, oscillators 213 and 218, detector crystals 214, 224, 219 and 229 and I. F. amplifiers 216 and 226 are all standard microwave frequency components and their selection and design may easily be accomplished by one skilled in the art. I. F. transformers 215, 225, 217 and 227 are shown and will be treated in the following detailed description as wire wound components for convenience, but well-known types of wave-guide transformers are equally suitable.

Hybrid junctions 211 and 220 can be structures of the so-called wave-guide junction or wave-guide coaxial or other transmission line loop structures of the types illustrated and described, for example, in the copending application of W. A. Tyrrell, Serial No. 470,810, filed December 31, 1942, which has now matured into United States Patent 2,445,895, granted July 27, 1948, and described in the Proceedings of the Institute of Radio Engineers, volume 35, November 1947, pages 1294–1306, or of the type illustrated and described with reference to Figs. 4, 5 and 6 in the copending application of W. D. Lewis, Serial No. 789,985, filed December 5, 1947 which has matured into United States Patent 2,531,447, issued December 28, 1950.

Whatever form of hybrid structure is employed it should have four terminations, associated in two pairs, each termination of a pair being conjugately related to the other termination of the same pair. For convenience here, the notation adopted in the above-mentioned application of W. D. Lewis will be employed throughout the following description and figures of the drawings showing hybrid junctions, in which the first pair will be designated P and S, respectively, and the terminations of the second pair will be designated A and B, respectively. The inherent properties of the hybrid junction are well known in which voltage wave energy introduced into the structure from either termination of the first pair will produce no energy leaving the structure by the other termination of that pair, but the energy introduced will divide equally between the other pair of terminations A and B of the hybrid structure.

Further, the voltage waves representing the halves of the energy in each of the second pair of terminals A and B will be in phase if the energy is introduced by the P termination of the first pair, or 180 degrees out of phase if it is introduced by the S termination of the first pair.

Conversely, if equal voltage wave energies are introduced in phase to the two terminations A and B of the second pair they will combine in the termination P of the first pair, no voltage wave energy being transmitted to the termination S.

If equal voltage wave energies are introduced 180 degrees out of phase to the two terminations A and B they will combine in the termination S of the first pair, no voltage wave energy being transmitted to the termination P.

With the basic principles of hybrid junctions in mind the operation of the repeater of Fig. 2 may be analyzed as follows:

The incoming signal of mid-frequency $f_s$ and sidebands $\pm m$ is amplified by amplifier 210 and fed into hybrid 211 where the signal power divides equally between arms P and S. No signal power appears at terminal B. The output of the receiving oscillator 213 connected to arm B of hybrid 211 similarly divides equally between the arms P and S, and does not appear at arm A. Thus crystals 214 and 224 terminating arms P and S are fed power from both the signal and receiving oscillator 213. The receiving oscillator frequency $f_R$ is adjusted so that $$f_R - f_S = f_2 \qquad (11)$$

where $f_2$ is the intermediate frequency. The sidebands of $f_s$ will appear inverted at the I. F. frequency because $$f_R - (f_S - m) = f_2 + m \qquad (12)$$

and $$f_R - (f_S + m) = f_2 - m \qquad (13)$$

The heterodyne output from the detectors 214 and 224 at the I. F. frequency $f_2$ passes through the I. F. amplifiers 216 and 226 to the crystals 219 and 229 connected to the hybrid 220. The transmitting oscillator 218 is also connected to the hybrid in such a way that the oscillator power divides equally between the two arms P and S. Thus crystals 219 and 229 are energized by the I. F. signals and transmitting oscillator 218 and generate beats between these two frequencies. The transmitting oscillator 218 is set to operate at a frequency $f_T$ such that $$f_3=f_2+f_T \quad (14)$$

where $f_3$ is the desired output frequency. No inversion takes place in this heterodyne process since $$(f_2+m)+f_T=f_3+m \quad (15)$$

and $$f_2-m+f_T=f_3-m \quad (16)$$

and therefore the inversion occurring in the first heterodyne process is preserved. The beat signals generated by the crystals 219 and 229 are fed into hybrid 220 in such a way that the outputs of the two crystals add in arm A, and no desired output power is fed into arm B. This can be seen by tracing the significant phase shifts occurring in passing through the system via the two parallel paths. The input signal at A of hybrid 211 appears in the same phase at crystals 214, and the receiving oscillator power appears 180 degrees out of phase at crystals 214 and 224. This 180-degree phase difference is carried through the beating process and appears in the I. F. signals fed to the crystals 219 and 229. Transmitting oscillator 218 is fed to the B terminal of hybrid 220 and therefore reaches the two crystals 219 and 229 with 180-degree phase difference. Thus the two 180-degree phase shifts, in I. F. and transmitting oscillator, effectively cancel each other in the beating process so that the desired beat outputs from the two detectors are in phase. Equal phase signals at P and S of hybrid 220 will appear in arm A and not in arm B. From the hybrid the output signal goes to the radio-frequency amplifier 221 which is presumed to have a band-pass characteristic which passes the desired signal $f_3 \pm m$ and does not pass the undesired beat product generated by crystals 219 and 229 which has a frequency $$f_4=f_T-f_2 \quad (17)$$

The complete repeater shown in Fig. 2 is generalized so that it may be adapted to different conditions such as to band-width and frequency. Thus, depending on circumstances, either or both of the radio frequency amplifiers 210 and 221 may be omitted and the amplification concentrated in the I. F. amplifiers, or the I. F. amplifiers 216 and 226 may be omitted and all amplification accomplished in one or both of the radio frequency amplifiers. Also balanced transformers may be substituted for the transformers 215, 225 and 217, 227 and the two I. F. amplifiers 216, 226 replaced by a single I. F. amplifier.

The inversion process as heretofore described has been accomplished by inverting the signal band in the frequency spectrum about the carrier frequency. It may now be pointed out, however, that additional advantages may be realized if the sideband inversion is accompanied by a translation of the frequency by a small amount from the original carrier frequency. These advantages are realized without appreciable sacrifice of the distortion canceling advantages described in detail above.

For specific example assume that the input carrier frequency $f_s$ of the inverting repeater as shown in Fig. 2 is 50,000 megacycles and the receiver oscillator frequency $f_R$ is 48,375 megacycles. Thus an intermediate frequency $f_2$ is provided of 1,625 megacycles. If the transmitter oscillator frequency $f_T$ is chosen to be 52,125 megacycles, the repeater output will be inverted about 50,500 megacycles, the new carrier frequency $f_3$, and thereby translated by 500 megacycles from the original input frequency $f_s$.

One advantage of such translation is apparent. High gain repeaters are inherently susceptible to feedback from the output to the input circuits. This is often a limiting factor in the degree of gain obtainable from a single repeater and demands excessive requirements of input and output circuit isolation. Thus frequency changing in the repeater allows the input and output signals to be at different frequencies thereby eliminating the probability of feedback.

It may be easily shown that when sideband inversion is accompanied by a carrier frequency translation of an amount T, the value of $\theta$ per section in Equation 3 is reduced by a factor of approximately $$\frac{3T}{2f}$$

where $f$ is the original carrier frequency relatively far above cut-off. Thus in the assumed example the effect of translation would be to reduce the average $\theta$ per section to 0.15 per cent of the value per section without inversion. The increase in B for small translations is so small compared to inversion about the original carrier as to be negligible in all practical cases.

Further advantages are obtained from translation when several adjacent channels are to be amplified simultaneously as will be shown later.

Figure 3:
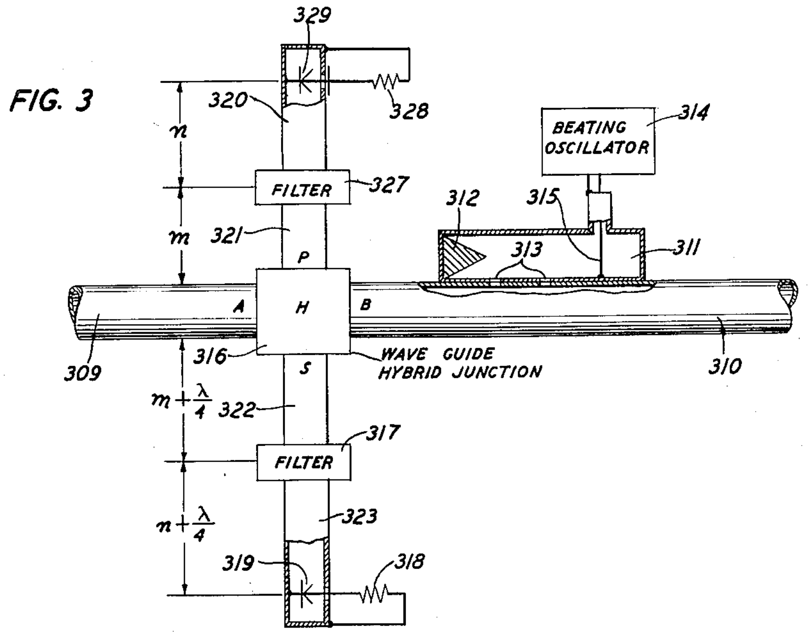
Fig. 3 illustrates a bridging inverter capable of substitution for the inverting repeater.

Fig. 3 shows a particular embodiment of a bridging inverter capable of performing sideband inversion with or without translation at a point in a wave-guide system where it is desirable to invert the signal frequencies and/or translate a particular amount without inserting gain or at a point where radio frequency amplification only is used. The bridging inverter may be connected to a transmission line or wave guide in such a way that it will select a certain desired frequency band arriving either from the left on line 309 or from the right on line 310. The selected frequency band will be inverted and translated in frequency and returned to the transmission system. Signals arriving from the left will be sent on from the device to the right via line 310 and similarly signals arriving from the left will be sent on to the right via line 309. While the device can work in either direction, it cannot work in both directions at once.

The inverter comprises a beating oscillator 314 coupled by means of directional coupler 311 to wave guide 310. Wave guide 310 is connected to termination B of hybrid junction 316, and wave guide 309 is connected to the conjugate termination A thereof. Filter sections 317 and 327 are connected to the conjugate arms P and S of hybrid 316 and the outputs of each filter are terminated by crystals 319 and 329, respectively.

The directional coupler 311 may be of the type disclosed in the United States application of W. W. Mumford, Serial No. 540,252, filed June 14, 1944, which has matured into United States Patent 2,562,281, issued July 31, 1951, and described in The Proceedings of the Institute of Radio Engineers, February 1947, volume 35, pages 160 to 165.

Other components are well known in the art or may be of the types described in connection with the inverting repeater shown in Fig. 2.

Identical filters 317 and 327 may have either a single pass band which includes both the input and output frequency bands $f_{in}$ and $f_{out}$, or two separate pass bands at these frequencies. In particular, they must reject any frequency bands which are to be passed through the device from line 309 to 310 without being affected. These filters must also have another pass band which includes the heterodyne frequency $f_0$ which may be expected to be approximately twice the frequency of $f_{in}$ or $f_{out}$ which will lie fairly close together. The other side of the main transmission line 310 is connected to the B arm of hybrid 316, and a directional coupler 311 is included in this line. The heterodyne oscillator 314 and a lossy termination 312 are connected to the other side of directional coupler 311. The directional coupler is arranged to feed the oscillator power toward the hybrid 316, and is adjusted to have weak coupling to the line 310 so that it does not react appreciably on signals flowing in 310. The filters 317 and 327 are connected to crystals 319 and 329 by the transmission lines 320 and 323. Resistors 318 and 328 complete the direct-current path of crystals 319 and 329 respectively. The lines 321 and 322 must be so proportioned that the effective electrical length $$m+\frac{\lambda}{4}$$

of 322 is approximately one-quarter wavelength or odd multiple thereof greater than the effective electrical length $m$ of line 321 for all frequencies which must pass through the device unaffected. Since these frequencies are likely to be near the desired $f_{in}$ and $f_{out}$ it will be assumed that these lines differ by one-quarter wavelength of the desired frequencies also in order to simplify the description. However, it will be realized that compensating filter sections can be incorporated to correct for differences in line lengths at different frequencies if this becomes necessary in a particular design. The line 323 should also have an electrical length $$n+\frac{\lambda}{4}$$

at frequencies $f_{in}$, $f_{out}$ one-quarter wavelength greater than the length $n$ of corresponding line 320.

The operation of the circuit of Fig. 3 may be analyzed as follows: Consider first frequencies arriving on line 309 which are to pass through the device unaffected. Such an input signal divides equally between arms P and S of hybrid 316 and flows through lines 321 and 322 to the filters 317 and 327 which reject these frequencies and therefore reflect them back along lines 321 and 322 toward the hybrid. However, the component that has traversed line 322 has traveled twice through the extra quarter wavelength included in 322 and therefore arrives back at the hybrid with a total phase shift of 180 degrees with respect to the component which followed line 321. As a result of this phase shift these components are transmitted out of the B arm of the hybrid to line 310 without being altered. Exactly the same thing happens for signals arriving from line 310 which are passed on to line 309 unaffected.

Now consider a signal of frequency $f_{in}\pm A$ which is to be inverted. It also divides into arms P and S of the hybrid and flows through lines 321 and 320 on one side and lines 322 and 323 on the other side. This frequency is passed by the filters 317 and 327 and so reaches the crystals 319 and 329. The heterodyne oscillator signal also flows into the hybrid via arm B and through lines 321 to 320 and 322 to 323 to crystals 319 and 329, since it also passes through filters 317 and 327. The signal frequency reaches crystal 319 with an extra 180-degree phase shift with respect to the signal reaching crystal 329. Likewise, the oscillator signal reaches crystal 319 with an excess phase shift due to the lines of 360 degrees since it is approximately twice $f_{in}$. Then at the reference of crystal 329 we have a beat signal $f_1$ generated having a value equal to $$f_1=f_0-f_{in}=f_{out} \quad (18)$$

and at crystal 319 we have a beat $f_2$ generated having a value equal to $$f_2=(f_0+180°-360)-(f_{in}-180°)=f_0-f_{in}=f_{out} \quad (19)$$

In the above relation for $f_2$ the first 180-degree shift in $f_0$ is the relative phase shift in the hybrid between arms B and S, and the 360 degrees, which may be dropped, results from the excess lengths in lines 322 and 323 which also account for the 180-degree shift in $f_{in}$. The excess lengths cause twice the shift in $f_0$ that they cause in $f_{in}$ because $f_0$ is assumed to be approximately twice $f_{in}$. The beat frequencies $f_1$ and $f_2$ generated in the crystals 319 and 329 are equal and in phase. They travel to the hybrid via lines 320—321 and 322—323 and thus arrive at the hybrid 180 degrees out of phase due to the extra length of lines 322—323. This causes them to combine in the B arm of the hybrid and pass out of the device via line 310.

This type of circuit has the property of accomplishing the inversion and translation of $f_{in}$ to $f_{out}$ by a single heterodyne with one pair of crystals and one local oscillator as contrasted to the circuit of Fig. 2 which requires two sets of crystals and two local oscillators. The translation property is clear from the above description. The inversion of the sidebands may be demonstrated as follows:

$$f_0-(f_{in}+A)=f_0-f_{in}-A=(f_{out}-A) \quad (20)$$

$$f_0-(f_{in}-A)=f_0-f_{in}+A=(f_{out}+A) \quad (21)$$

Figure 4:
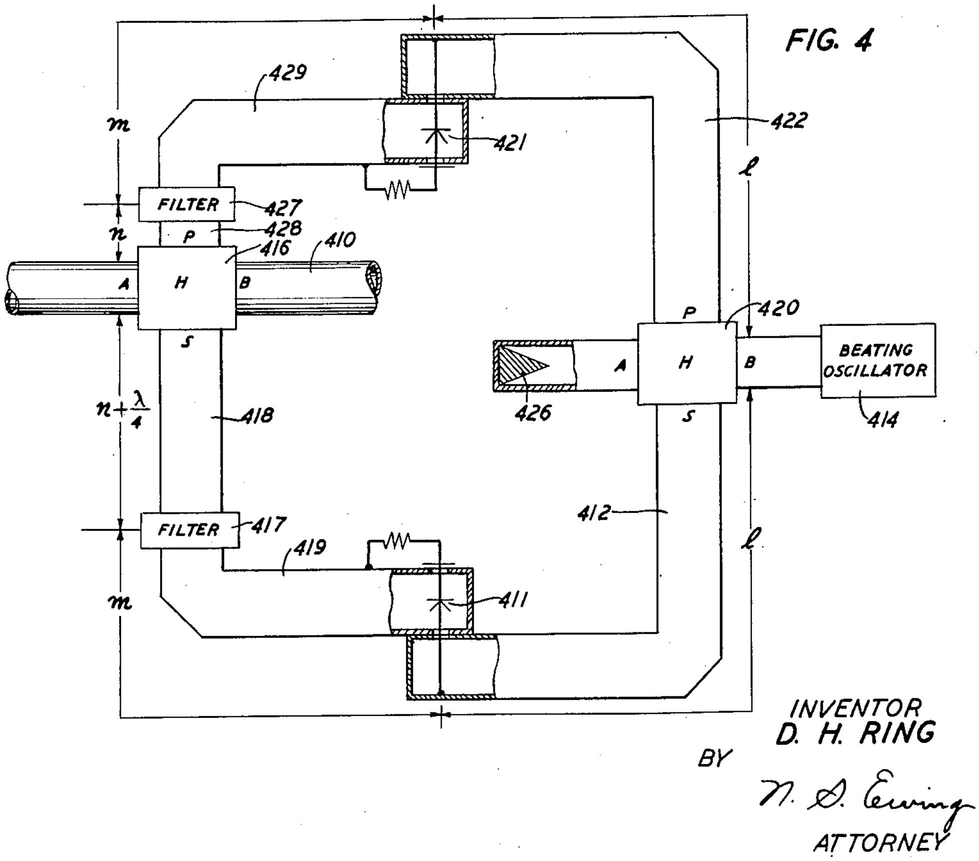
Fig. 4 illustrates a second embodiment of a bridging inverter.

Fig. 4 illustrates another arrangement with the similar characteristics as those of Fig. 3. The input line 409 and the output line 410 are connected to the A and B arms of hybrid 416. The S and P arms of 416 are connected to the rejection filters 417 and 427, respectively, via lines 418 and 428. Line 418 of length $$n+\frac{\lambda}{4}$$

is effectively one-quarter wavelength longer than line 428 of length $n$. The crystal rectifiers 411 and 421 are connected to the filters 417 and 427 by lines 419 and 429 of equal length $m$. The heterodyne oscillator 414 operating at approximately twice the desired signal frequency may be connected to the crystals 411 and 421 by any desired balanced circuit. A convenient way is to use the hybrid 420 with oscillator 414 connected to the B arm and the crystals 411 and 421 fed via lines 412 and 422 of equal length from the S and P arms. Arm A should be terminated in a matched attenuator 426 to absorb stray reflections. Filters 417 and 427 should reject signals of all frequencies to be passed through the device unaffected, and pass the desired frequencies $f_{in}$ and $f_{out}$. Their performance at $f_0$ need not be specified.

This circuit operates in the same manner as that shown in Fig. 3 with respect to frequencies rejected by the filters. Frequencies passed by filters 417 and 427 go on to crystals 411 and 421 where they form beat notes with the oscillator 414 frequency $f_0$. In this case $f_{in}$ reaches crystal 411 with an excess phase shift of one-quarter wavelength and $f_0$ reaches crystals 411 and 421 with a phase difference of 180 degrees since oscillator 414 is connected to the B arm of hybrid 420. Therefore, $$f_1=f_0-f_{in}=f_{out} \quad (22)$$

$$f_2=(f_0+180)-(f_{in}-90°)=f_0-f_{in}+270°=f_{out}+270° \quad (23)$$

where $f_1$ and $f_2$ are the beat frequencies generated by crystals 421 and 411, respectively. Frequencies $f_1$ and $f_2$ reach the hybrid 416 by way of lines 428 and 418, respectively, and $f_2$ is retarded one-quarter wavelength with respect to $f_1$ by the extra quarter-wavelength shift in line 418. This changes the relative phase difference from 270 degrees to 180 degrees so that $f_1$ and $f_2$ appear at arm B of hybrid 416 in phase and are transmitted out of the device on line 410.

Having thus described the operation of the inverting repeaters of Figs. 3 and 4, certain refinements in the component configuration may be pointed out. In the foregoing description it has been assumed that the beating oscillator frequency, in each case represented by $f_0$, was approximately twice the line frequencies, in each case represented by $f_{in}$. The crystal detectors employed produce a modulated output which had a frequency of $f_0-f_{in}$. This type modulation is known in the art as second order modulation.

Third order modulation may, however, be employed, and under certain circumstances would be desirable since the beating oscillator frequency $f_0$ would then be required to have approximately the same frequency as $f_{in}$ rather than twice the frequency thereof. If an oscillator frequency $f_0$ and a signal frequency $f_{in}$ are applied to a third order detector the modulated output will have a frequency $2f_0-f_{in}$, or in other words, the effect of the third order modulator is to effectively convert the oscillator frequency $f_0$ to $2f_0$ and then beat this in the manner of the second order modulator with $f_{in}$. Further, all phase angles associated with $f_0$ are also multiplied by the factor 2. The importance of this feature may be seen by referring again to Fig. 3.

If third order modulators are employed for detectors 319 and 329, and beating oscillator 314 has a frequency approximately equal to $f_{in}$, lines 322 and 323 may have a length of one-sixteenth wavelength greater than lines 321 and 320, respectively, or a combined wavelength of $$\frac{\lambda}{8}$$

greater than the combined length of lines 321 and 320. The purpose of this choice of length is apparent. There will be a phase shift of 45 degrees in the signal reaching detector 319, an effective phase shift of 90 degrees in the oscillator frequency (45 degrees multiplied by 2) and another 45 degrees phase shift in the modulated product returned to hybrid 316 with the resultant phase shift of 180 degrees in the signal returned to hybrid 316 from detector 319 with respect to the signal returned to hybrid 316 from detector 329. This is the relative phase shift required so that the half signals will combine in phase in the output line.

With similar phase relation adjustments, the third order modulation principles may be incorporated in the inverter configuration of Fig. 4, with the resulting advantage that the beating oscillator 414 need only operate at one-half the frequency formerly required.

Certain detector materials are known to have cubic components in their characteristics and are thus suitable for third order modulation. The ordinary silicon crystal has certain of these characteristics, however, in a somewhat less degree, and with the predominant presence of second order components. If two of these crystals are located in the same transverse plane in the wave-guide section, but connected with opposite polarity, a suitable third order modulator is obtained. The respective components from each crystal will add in effect for cubic operation but will cancel so far as the second order modulation product is concerned.

In the preceding discussion directed to Fig. 1 and the component repeaters and inverters thereof of Figs. 2, 3 and 4, it has been assumed that the total signal to be transmitted derived from the frequency multiplexing source has been impressed or modulated upon a single microwave carrier resulting in a high frequency signal comprising a set of signal sidebands having a band width of only several hundred megacycles. The maximum value of this band width is, of course, limited to a great extent by the frequency handling capacity of known microwave amplifiers in the terminal equipment and in the repeaters along the line. As future development in the field of broad-band amplifiers increases the band width capacity of the component microwave amplifiers, the usable band width of the high frequency signal transmitted in this manner may possibly be increased.

Another factor which may in certain cases be a limiting parameter in determining the maximum band width capable of transmission in the above manner becomes apparent upon further consideration of Equations 8 and 9. It is evident that the value of B, the introduced phase or delay distortion, will increase as the transmitted band width is increased since the difference between $\Phi_1$ and $\Phi_2$ will greatly increase as the frequency band width is increased past a certain point. This point of course depends on the particular characteristics of the transmission medium. When the inverted signal band width is limited to several hundred megacycles in the common long wave guide, the phase distortion remains so small as to be of no consequence. When a much larger band width is transmitted this distortion becomes appreciable. As pointed out hereinbefore, phase distortion may be equalized by well-known equalizing methods, but as the magnitude of the distortion increases such expensive and intricate phase equalizers are required as to be prohibitive.

Since the potentially useful band width of a microwave guide is well in excess of 25,000 megacycles, it is desirable to reduce the aforesaid limitations upon the transmitted signal band width by the component amplifiers and by phase distortion and at the same time to retain the beneficial effects of band inversion. This result is accomplished in accordance with a feature of the invention in which a multiplicity of total signal bands, each with the previous band width of several hundred megacycles, are modulated upon individual microwave carriers. The multiplicity of sideband pairs resulting therefrom are impressed concurrently on the single wave guide. At intervals along the wave guide each set of signal sidebands with their associated carrier comprising one transmission channel is separated from the others, amplified and inverted individually for application to the succeeding sections of the guide.

Figure 5:
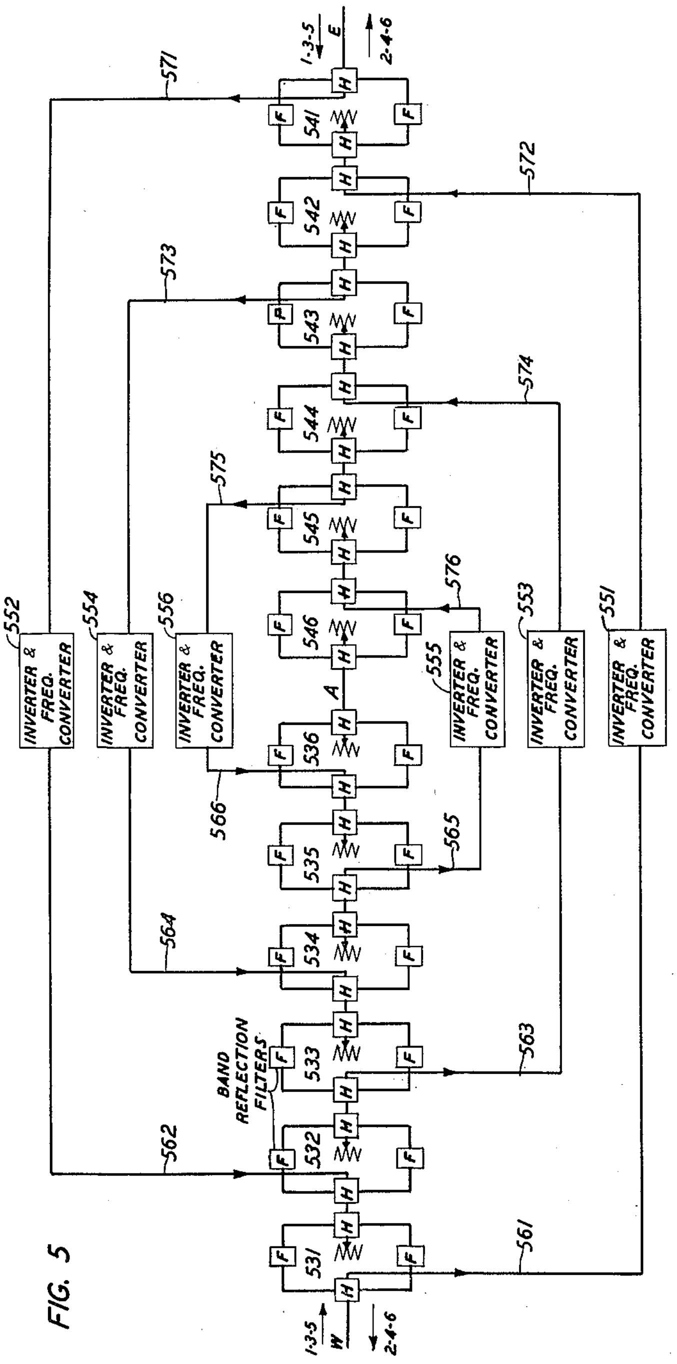
Fig. 5 shows, in block schematic diagram form, a multichannel inverting repeater system applicable to a wave-guide transmission system.

Fig. 5 shows, in block schematic diagram, a multichannel inverting repeater system in which for example, three two-way channels may be separated, amplified, inverted, and translated by a desired amount. Such a multi-channel repeater is suitable for use in a system as shown in Fig. 1 when the transmitted signal comprises a multiplicity of signal channels of the type described. This circuit as illustrated by way of example, comprises twelve constant impedance microwave hybrid branching filters, of the type detailed in Fig. 5A, connected in cascade. The system chosen for illustration of three two-way channels is merely an example of the application of the principles of the invention. It is evident that no minimum number of channels is required; and conversely, the system may be extended to incorporate any number of such channels.

Figure 5A:
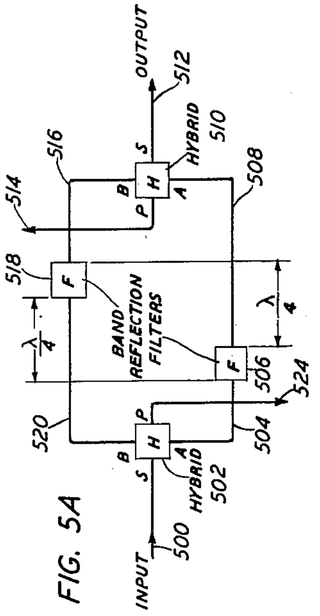
Fig. 5A illustrates, in block schematic diagram form, the basic hybrid branching filter of Fig. 5.

The constant impedance microwave hybrid branching filter as shown in Fig. 5A is disclosed in detail in the above-mentioned application of W. D. Lewis, Serial No. 789,985, filed December 5, 1947, which has matured into United States Patent 2,531,447, issued December 28, 1950, and in the article entiled "A non-reflecting branching filter for microwaves" in the Bell System Technical Journal, volume 27, January 1948, pages 83–95. As described therein, the hybrid junctions 502 and 510 are arranged with the terminations A and B connected to the transmission line 504 and 520, with transmission line 520 longer by substantially one-quarter wavelength of the median frequency of the frequency range of the channel to be segregated or branched than line 504. The identical band or channel reflection filters 506 and 518 are designed to reflect the frequency of the channel to be segregated, and to pass freely all energy not in the reflected band.

Since the constant impedance branching filter, its properties, details of operation and the required components therein have been discussed in full in the above cited patent application and publication, it will be necessary here only to summarize the general performance thereof as related to Fig. 5A.

If a voltage wave comprising a plurality of channels, one of which is in the reflection range of filters 506 and 518, is applied to input line 500, it will divide equally into arms A and B. None of the power in this wave is reflected back into arm S or appears initially in arm P of hybrid 502. The equal components of the wave travel along lines 520 and 504 to filters 518 and 506. All energy in the input wave, except that channel in the band of reflection filters 518 and 506, will pass therethrough and appear in termination S of hybrid 510. Energy in lines 520 and 504 within the reflected channel will travel back to input hybrid 502. Due to the quarter-wave line length difference and the inherent properties of hybrids as discussed before, the two components will combine in termination P of hybrid 502 to form a wave equal the branched channel wave and appear in line 524.

Similarly, if said voltage wave is applied to the P termination of hybrid 502, energy within the reflected channel will combine in termination S of hybrid 502 and appear in line 500. All other frequency components will combine in the P termination of hybrid 510 and appear in line 514.

Since the branching filter configuration is symmetrical all that has been said with respect to an input wave applied to terminations S and P of hybrid 502 would be equally true of an input wave applied to termination S and P of hybrid 510 respectively.

With this operation of the basic unit band separation or branching filter in mind, referring again to Fig. 5, it will be seen that channels incoming from the west are separated and branched by filters 531, 533, and 535. Likewise incoming channels from the east are separated and branched by filters 541, 543, and 545. The channels from the west upon being separated and applied to inverting repeaters 551, 553 and 555 are then reinserted into the east line by filters 546, 544 and 542. Likewise the channels from the east upon being separated and applied to inverting repeaters 552, 554 and 556 are then reinserted into the west line by filters 532, 534, and 536.

Inverting repeaters 551 through 556 respectively may be of the types described hereinbefore and of which particular embodiments are shown in Figs. 2, 3, and 4 and their various modifications. Each of these inverting repeaters may amplify the separated channel, invert the side bands thereof, and translate the frequency a desired amount. Assume for example signal transmission channels 1 through 6 of successively increasing frequency associated with the multichannel inverting repeater of Fig. 5, channels 1, 3, and 5 containing signal frequency energy being applied incoming from both directions east and west, and channels 2, 4, and 6 to be used to transmit signal frequency energy outgoing in both directions east and west. For example, channels 1 through 6 may be spaced 500 megacycles, midband frequency to midband frequency, channel 1 being 48,000 megacycles and channel 6 therefore being 50,500 megacycles.

Such a system arrangement utilizing the same frequencies incoming from each direction and the same frequencies outgoing in each direction substantially reduces the danger from cross-talk since high and low level signals at the same frequency do not occur anywhere in the repeater. In other words, since the incoming low level signals of channels 1, 3 and 5 are amplified and translated to channels 2, 4 and 6 in the high level output, there is no opportunity for feedback or cross-talk from the repeater output to the repeater input. This advantage of translation has been pointed out hereinbefore.

Branching filters 531 and 541 are selected in accordance with the discussion directed to Fig. 5A to reflect frequencies of channel 1. Likewise, branching filters 532 and 542 reflect channel 2, 533 and 543 reflect channel 3, filters 534 and 544 reflect channel 4, filters 535 and 545 reflect channel 5, and filters 536 and 546 reflect channel 6. Each channel branching filter passes frequencies not in the reflected band, or in the particular case, frequencies in the other five channels.

The exact operation of the cascade connected basic filter units will become obvious upon tracing the signal path of the frequencies in one channel through the repeater system, for example those of channel 1.

The high frequency signal comprising microwave frequencies in the range of channels 1, 3 and 5 are applied from the west to band reflection filter 531 and from the east to band reflection filter 541. Signals in channel 1 from the west are branched down line 561 and remaining signals in channels 3 and 5 are passed to filter unit 532. The branched energy in line 561 is applied to inverting repeater 551 where it is amplified, inverted, translated to the frequency range of channel 2, i. e., for the assumed channel spacing, a translation of 500 megacycles, and applied to line 572. Energy in line 572 is applied to filter unit 542 which reflects the energy to filter unit 541 through which it passes to the east transmission line in outgoing channel 2. In like manner signals in incoming channel 1 from the east are branched by filter 541 and transmitted down line 571 to inverting repeater 552. Upon being amplified, inverted about its carrier frequency and translated to the frequency of channel 2, the signals are transmitted down line 562 to filter 532. Filter 532 reflects the energy toward the west where it passes through filter 531 to the west line in channel 2.

In identical fashion, signals arriving from the west in channel 3 pass through filters 531 and 532 and are branched into line 563 by filter 533, amplified, inverted, translated in inverting repeater 553 to the frequency of channel 4, applied down line 574 to filter 544, and transmitted through filters 543, 542 and 541 to the east line. Also signals in the range of channel 3 from the east are branched, amplified, inverted, translated, and sent out in channel 4 to the west.

It is noted that the channels have been arranged with the low level receiving frequencies interlaced with the high level transmitting frequencies. This provides a translation of only one channel spacing so that the greatest benefit may be derived from sideband inversion with respect to eliminating the effects of dispersion as discussed hereinbefore.

A particular feature of the invention as shown in Fig. 5 is the ability of the multichannel inverting repeater to pass all frequencies unaffected which are not in the particular channels to be branched, amplified and inverted. The connection "A" as shown in the drawing connects the two banks of cascade filters 631 through 536 and 541 through 546. Thus all frequencies arriving in the west line, for example, not branched by filters 531 through 536, will pass through the "A" connection and continue on to the east line. These frequencies may of course be branched at a subsequent multichannel repeater at which previously amplified or inverted channels are allowed to pass unaffected.

It is evident that all operations such as inversion, amplification or translation need not be performed by the repeaters 551 through 556, respectively, at every station or for every channel at each station but that the repeaters may be designed to perform any one or a combination of operations upon the branched channel. For example, the signal carried by channel 1 might be of the pulse modulation type and require the operation of regeneration as described hereinbefore. In such an event, 551 would be a regeneration repeater of the type described.

Figure 6:
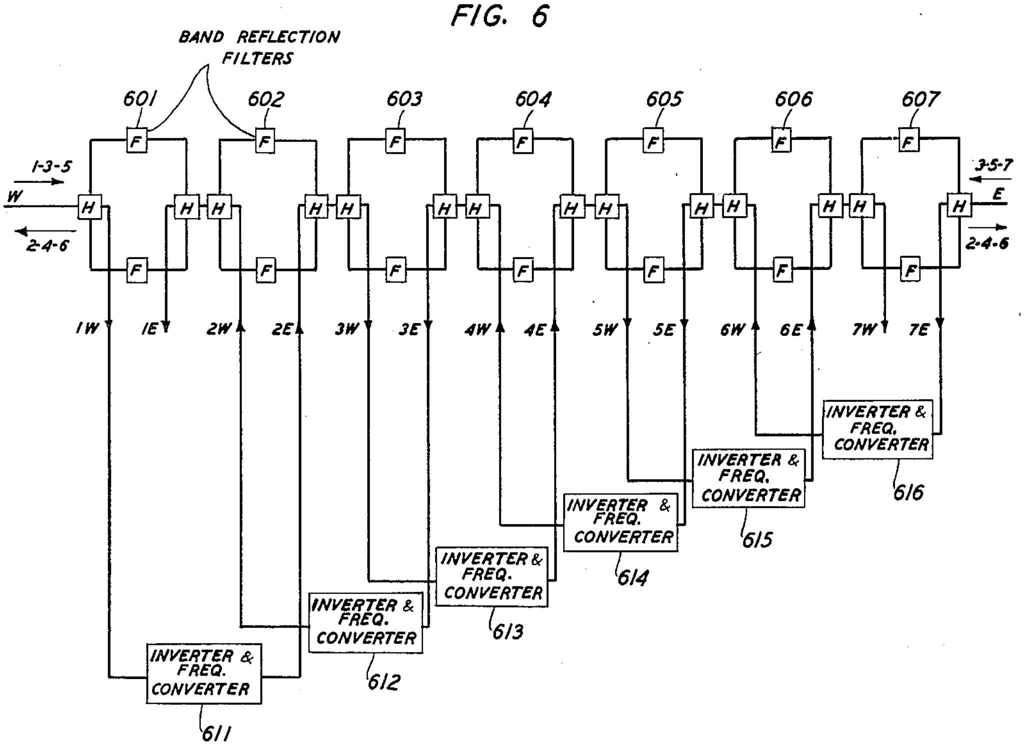
Fig. 6 illustrates, in block schematic diagram form, a variation of the arrangement of Fig. 5 entailing a smaller number of filter units.

Fig. 6 illustrates in block schematic diagram form, a variation of the arrangement of Fig. 5 in which the number of filter units has been reduced by approximately one-half by the expedient of using the two sides of the basic filter unit of Fig. 5A to separate the same frequency arriving from opposite directions.

Band reflection filters 601 through 607, inclusive, are connected in cascade between the incoming west line and the incoming east line. As shown, seven channel frequencies 1 through 7 of successively increasing frequency range are employed to provide six operating channels. Channels 1, 3, and 5 are applied in the incoming direction from the west, and channels 3, 5, and 7 are applied in an incoming direction from the east. Channels 2, 4, and 6 are applied in an outgoing direction to both east and west lines. Therefore, like the system of Fig. 5, one frequency is used for receiving from each direction and another for transmitting in each direction in order to eliminate the possibility of feedback from the output circuit of the repeater to the input circuit thereof. The channels are again arranged with low level receiving frequencies interlaced with the high level transmitting frequencies to provide a minimum of only one channel translation in the inverting repeater.

The signal from the west comprising frequencies in channels 1, 3 and 5 is applied to branching filter 601. Signals in channel 1 are branched off and applied to inverting repeater 611 and the remaining unbranched channels 3 and 5 pass on to filter unit 602. Inverting repeater 611 amplifies, inverts, and translates the signal to the frequency range of channel 2. The resulting signal is applied to filter 602 where it is reflected to filter 603 from which it passes unaffected through the remaining filter units to the east line.

Signals carried in channels 3 and 5 are successively branched off by filters 603 and 605 respectively, amplified, inverted and translated to the next channel frequency by inverting repeaters 613 and 615 respectively, and reinserted to be reflected by filters 604 and 606, respectively, to the east line.

In identical fashion signal energy carried in channels 3, 5 and 7 from the east line is branched, amplified, inverted, and translated to channels 2, 4 and 6, respectively, and applied to the west line.

It should be noted that the system of Fig. 6 passes all frequencies not included in the separated channels through the filter repeater system unaffected in both directions. Thus additional channels outside of the six-channel range not requiring amplification or inversion would pass through and proceed directly to the next repeater as in the system of Fig. 5.

Components 611 through 616, respectively, have been indicated by way of example as performing the operations of amplification, inversion, and translation, however, these components are not limited to these particular functions or any combination of these functions, but may for example, be of such type as to afford pulse regeneration if the particular channel should contain the transmitted signal of a pulse modulation system.

In all cases it is to be understood that the above described arrangements are illustrative of the application of the principles of the invention. Numerous other arrangements may be devised by those skilled in the art without departing from the spirit and scope of the invention.

What is claimed is:

1. In combination, a source of carrier frequency signals, a source of intelligence signals, modulator means connected to said intelligence source and said carrier source, said modulator means adapted to impress said intelligence signals upon said carrier signal to produce a high frequency signal in which said intelligence is represented by phase and frequency relations between a set of signal sidebands and said carrier signal, a highly dispersive wave-guide transmission medium having one end thereof connected to said modulator, said high frequency signal applied to said wave-guide medium, demodulator means connected to the other end of said wave-guide medium, said demodulator means adapted to detect said phase and frequency relations between said carrier signal and said sideband signals and thereby to reproduce said intelligence signals, and inverter means located between said modulator means and said demodulator means along said wave-guide medium, said inverter means adapted to invert said set of signal sidebands about said carrier frequency thereby to preserve said phase relations during transmission through said dispersive transmission medium.

2. In combination, a source of carrier frequency signals, a source of intelligence signals, modulator means connected to said intelligence source and said carrier source, said modulator means adapted to impress said intelligence signals upon said carrier signal to produce a high frequency signal in which said intelligence is represented by phase and frequency relations between a set of signal sidebands and said carrier signal, a highly dispersive wave-guide transmission medium having one end thereof connected to said modulator, said high frequency signal applied to said wave-guide medium, demodulator means connected to the other end of said wave-guide medium, said demodulator means adapted to detect said phase and frequency relations between said carrier signal and said sideband signals and thereby to reproduce said intelligence signals, amplifier means located at intervals between said modulator and said demodulator for amplifying said high frequency signal, and circuit means located at intervals between said modulator and said demodulator for translating said carrier signal to a frequency slightly removed from the original frequency thereof and for inverting said sideband signals about said translated carrier frequency thereby to preserve said phase relations during transmission through said dispersive transmission medium.

3. In combination, a source of carrier frequency signals, a source of intelligence signals, modulator means connected to both said sources, said modulator means adapted to combine said intelligence signal and said carrier signal to produce a double sideband amplitude modulated high frequency signal, a highly dispersive wave-guide transmission medium having one end thereof connected to said modulator to receive said high frequency signal, demodulator means adapted to detect said double sideband high frequency signal connected to the other end of said wave-guide medium, and inverter means located between said modulator means and said demodulator means along said wave-guide medium adapted to invert said double sidebands about said carrier frequency.

4. In combination, a source of a plurality of carrier frequency signals, a source of a plurality of intelligence signals, multiplex modulator means connected to said intelligence source and said carrier source, said multiplex modulator means adapted to impress each of said intelligence signals upon a respectively corresponding one of said carrier signals to produce a plurality of multifrequency signals, the intelligence carried by each of said multifrequency signals being represented therein by phase and frequency relations between a set of signal sidebands and the carrier signal of said multifrequency signal, a highly dispersive transmission medium having one end thereof connected to said modulator, said plurality of multifrequency signals applied to said transmission medium, multiplex demodulator means connected to the other end of said transmission medium, said demodulator means adapted to detect said phase and frequency relations between each carrier signal and the set of sideband signals associated therewith to reproduce the intelligence signal carried by each of said multifrequency signals, separating means located at intervals along said transmission medium to separate each of said multifrequency signals from said transmission medium, inverting means associated with each of said separating means to invert the signal sidebands about the carrier frequency of each multifrequency signal thereby to preserve said phase relations during transmission through said dispersive transmission medium, and combining means to reimpress each of said multifrequency signals upon said transmission medium.

5. A wide band microwave transmission system comprising, in combination, a hollow-pipe wave guide connecting a transmitting station and a geographically distant receiving station, a source of carrier waves, means to modulate said carrier waves with a wide band signal to produce signal bearing modulation components extending on both sides of the carrier wave frequency and occupying a wide frequency range over which the phase frequency characteristic of said wave guide is substantially non-linear, means at said transmitting station to apply said modulation components to said wave guide for transmission thereover to said receiving station, demodulating means connected to said guide at said receiving station for combining modulation components on both sides of said carrier frequency to recover said wide band signal, and means to reduce amplitude distortion tending to appear in said recovered signal comprising means to invert said modulation components about a frequency at least approximating said carrier wave frequency at at least one point along said wave guide whereby the dispersion caused by one section of said guide is reduced by the dispersion of another section of said guide.

6. A wide band microwave transmission system comprising, in combination, a hollow-pipe wave guide connecting a first station and a geographically distant second station, a source of carrier waves located at each of said stations producing a plurality of frequency spaced carrier waves, means at each station to modulate each of said plurality of carrier waves with a wide band signal to produce a plurality of sets of signal bearing modulation channels occupying a first group of frequency spaced bands, each channel comprising frequency components extending on both sides of each carrier wave frequency and occupying in each of said bands a frequency range over which the phase frequency characteristic of said wave guide is substantially non-linear, means at each of said stations to apply said channels to said wave guide for transmission thereover to the other of said stations, means connected to said guide at each of said stations for combining each set of modulation components on both sides of each carrier frequency as received from the other of said stations to recover said wide band signal, and repeater means located along said wave guide between said stations to branch each channel arriving in one of said first group of bands at said location from both of said stations and to invert the frequency components in each branched channel and to retransmit each channel in a frequency band adjacent to said one band, said adjacent band being one of a second group of frequency spaced bands interleaved between the bands of said first group, the frequency spacing between the center frequency of said one band and the center frequency of said adjacent band being small compared to the frequency of said bands, said repeater means comprising a first plurality of branching units located along said transmission path, one unit of said plurality being effective uniquely to the frequency components for each of the bands of both groups to branch components in that band, a second plurality of branching units identical to said first plurality located along said transmission path, a connection from each of the branching units of each plurality effective for bands of said first group to the branching unit of the other plurality effective for said adjacent band, and means included in each connection for heterodyning the components branched by the unit effective for bands of said first group with a single frequency signal substantially equal the sum of the carrier frequency of said branched components and the center frequency of said adjacent band, said last-named means adapted to transmit to the branching unit effective for said adjacent band only the difference between said single frequency signal and said branched components, whereby modulation components in said branched channel are inverted about said center frequency and dispersion caused by said non-linear phase of the wave guide in one section is reduced by the dispersion of another section of said guide.

7. A wide band microwave transmission system comprising, in combination, a hollow-pipe wave guide connecting a transmitting station and a geographically distant receiving station, a source of carrier waves, said source producing a plurality of frequency spaced carrier waves, means to modulate each of said plurality of carrier waves with a wide band signal to produce a plurality of sets of signal bearing modulation components, each of said sets extending on both sides of each carrier wave frequency and occupying a wide frequency range over which the phase frequency characteristic of said wave guide is substantially non-linear, means at said transmitting station to apply all of said sets of modulation components to said wave guide for transmission thereover to said receiving station, demodulating means connected to said guide at said receiving station for combining each set of modulation components on both sides of each carrier frequency to recover said wide band signal, and means located at at least one point along said wave guide to reduce amplitude distortion tending to appear in said recovered signal, said last-named means comprising means to isolate each set of modulation components, means to invert each set of modulation components about a frequency at least approximating the carrier wave frequency thereof, and means for reapplying all of said isolated sets to said wave guide whereby the dispersion caused by one section of said guide is reduced by the dispersion of another section of said guide.

DOUGLAS H. RING.

REFERENCES CITED

The following references are of record in the file of this patent:

UNITED STATES PATENTS

| Number | Name | Date |
|---|---|---|
| 1,623,600 | Jammer | Apr. 5, 1927 |
| 1,658,337 | Jammer | Feb. 7, 1928 |
| 1,735,044 | Green | Nov. 12, 1929 |
| 1,973,504 | Pierrot | Sept. 11, 1934 |
| 2,154,594 | Weaver | Apr. 18, 1939 |
| 2,264,311 | Herrick | Dec. 2, 1941 |
| 2,311,467 | Peterson | Feb. 16, 1943 |
| 2,423,866 | Woodyard | July 15, 1947 |
| 2,505,368 | Shenk | Apr. 25, 1950 |